(12) United States Patent
Tran et al.

(10) Patent No.: US 11,941,508 B2
(45) Date of Patent: Mar. 26, 2024

(54) DIALOG SYSTEM WITH ADAPTIVE RECURRENT HOPPING AND DUAL CONTEXT ENCODING

(71) Applicant: ADOBE INC., San Jose, CA (US)

(72) Inventors: Quan Tran, San Jose, CA (US); Franck Dernoncourt, San Jose, CA (US); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 339 days.

(21) Appl. No.: 17/186,566

(22) Filed: Feb. 26, 2021

(65) Prior Publication Data

US 2022/0277186 A1 Sep. 1, 2022

(51) Int. Cl.
*G06F 16/00* (2019.01)
*G06F 16/242* (2019.01)
*G06N 3/042* (2023.01)
*G06N 3/044* (2023.01)
*G06N 3/045* (2023.01)
*G06N 3/08* (2023.01)

(52) U.S. Cl.
CPC .......... *G06N 3/042* (2023.01); *G06F 16/243* (2019.01); *G06N 3/044* (2023.01); *G06N 3/045* (2023.01); *G06N 3/08* (2013.01)

(58) Field of Classification Search
None
See application file for complete search history.

(56) References Cited

U.S. PATENT DOCUMENTS

2021/0005316 A1\* 1/2021 Neumann ................ G06N 3/08

FOREIGN PATENT DOCUMENTS

WO 2020069020 \* 4/2020 ......... G06F 16/3329

OTHER PUBLICATIONS

Bordes, et al., "Learning End-to-End Goal-Oriented Dialog", In 5th International Conference on Learning Representations, ICLR 2017, Toulon, France, Apr. 24-26, 2017, Conference Track Proceedings, OpenReview.net, arXiv:1605.07683v4 [cs.CL] Mar. 30, 2017, 15 pages.

(Continued)

*Primary Examiner* — Tuankhanh D Phan
(74) *Attorney, Agent, or Firm* — F. CHAU & ASSOCIATES, LLC

(57) ABSTRACT

The present disclosure describes systems and methods for dialog processing and information retrieval. Embodiments of the present disclosure provide a dialog system (e.g., a task-oriented dialog system) with adaptive recurrent hopping and dual context encoding to receive and understand a natural language query from a user, manage dialog based on natural language conversation, and generate natural language responses. For example, a memory network can employ a memory recurrent neural net layer and a decision meta network (e.g., a subnet) to determine an adaptive number of memory hops for obtaining readouts from a knowledge base. Further, in some embodiments, a memory network uses a dual context encoder to encode information from original context and canonical context using parallel encoding layers.

20 Claims, 9 Drawing Sheets

(56) References Cited

OTHER PUBLICATIONS

Das, et al., "Learning Cooperative Visual Dialog Agents with Deep Reinforcement Learning", In Proceedings of the IEEE international conference on computer vision, pp. 2951-2960, 2017.
Eric, et al, "A Copy-Augmented Sequence-to-Sequence Architecture Gives Good Performance on Task-Oriented Dialogue", In Proceedings of the 15th Conference of the European Chapter of the Association for Computational Linguistics: vol. 2, Short Papers, arXiv:1701.04024v3 [cs.CL] Aug. 14, 2017, pp. 468-473, 2017.
Eric, et al., "Key-Value Retrieval Networks for Task-Oriented Dialogue", In Proceedings of the 18th Annual SIGdial Meeting on Discourse and Dialogue, arXiv:1705.05414v2 [cs.CL] Jul. 14, 2017, pp. 37-49, 2017.
Gu, et al., "Incorporating Copying Mechanism in Sequence-to-Sequence Learning", In Proceedings of the 54th Annual Meeting of the Association for Computational Linguistics (vol. 1: Long Papers), arXiv:1603.06393v3 [cs.CL] Jun. 8, 2016, pp. 1631-1640, 2016.
Henderson, et al., "The Second Dialog State Tracking Challenge", In Proceedings of the 15th annual meeting of the special interest group on discourse and dialogue (SIGDIAL), pp. 263-272, 2014.
Hori, et al., "Dialog State Tracking with Attention-Based Sequence-to-Sequence Learning", In 2016 IEEE Spoken Language Technology Workshop (SLT), pp. 552-558. IEEE, 2016.
Kingma, et al., "ADAM: A Method for Stochastic Optimization", In Bengio, Y., and LeCun, Y., eds., 3rd International Conference on Learning Representations, ICLR 2015, San Diego, CA, USA, May 7-9, 2015, Conference Track Proceedings, arXiv:1412.6980v9 [cs.LG] Jan. 30, 2017, 2015, 15 pages.
Li, et al., "A Diversity-Promoting Objective Function for Neural Conversation Models", In Proceedings of the 2016 Conference of the North American Chapter of the Association for Computational Linguistics: Human Language Technologies, 2016a, arXiv:1510.03055v3 [cs.CL] Jun. 10, 2016, 11 pages.
Li, et al., "Deep Reinforcement Learning for Dialogue Generation", arXiv preprint arXiv:1606.01541v4 [cs.CL] Sep. 29, 2016, 2016b, 11 Pages.
Lin, et al., "Task-Oriented Conversation Generation Using Heterogeneous Memory Networks", In Proceedings of the 2019 Conference on Empirical Methods in Natural Language Processing and the 9th International Joint Conference on Natural Language Processing (EMNLP-IJCNLP), pp. 4550-4559, 2019.
Liu, et al., "Gated End-to-End Memory Networks", In Proceedings of the 15th Conference of the European Chapter of the Association for Computational Linguistics: vol. 1, Long Papers, pp. 1-10, 2017.
Madotto, et al., "Mem2Seq: Effectively Incorporating Knowledge Bases into End-to-End Task-Oriented Dialog Systems", In Proceedings of the 56th Annual Meeting of the Association for Computational Linguistics (vol. 1: Long Papers), arXiv:1804.08217v3 [cs.CL] May 21, 2018, pp. 1468-1478, 2018.
Nguyen, et al., Dialog Management of Healthcare Consulting System by Utilizing Deceptive Information, Transactions of the Japanese Society for Artificial Intelligence 35(1):DSI-C 1, 2020, 12 pages, 2020.
Papineni, et al., "BLEU: a Method for Automatic Evaluation of Machine Translation", In Proceedings of the 40th annual meeting of the Association for Computational Linguistics, pp. 311-318, 2002.
Qin, et al., "Entity-Consistent End-to-end Task-Oriented Dialogue System with KB Retriever", In Proceedings of the 2019 Conference on Empirical Methods in Natural Language Processing and the 9th International Joint Conference on Natural Language Processing (EMNLP-IJCNLP), arXiv:1909.06762v2 [cs.CL] Sep. 18, 2019, pp. 133-142.
Sukhbaatar, et al., "End-To-End Memory Networks", In Advances in neural information processing systems, pp. 2440-2448, 2015.
Tran, et al., "The Context-dependent Additive Recurrent Neural Net", In Proceedings of the 2018 Conference of the North American Chapter of the Association for Computational Linguistics: Human Language Technologies, vol. 1 (Long Papers), pp. 1274-1283, 2018.
Vinyals, et al., "Pointer Networks", In Advances in neural information processing systems, pp. 2692-2700, 2015.
Wen, et al., "Sequence-to-Sequence Learning for Task-oriented Dialogue with Dialogue State Representation", In Proceedings of the 27th International Conference on Computational Linguistics, pp. 3781-3792, 2018.
Williams, et al., "Scaling Up POMDPs for Dialog Management: The "Summary POMDP" Method", In IEEE Workshop on Automatic Speech Recognition and Understanding, 2005, pp. 177-182, IEEE.
Williams, et al., "Hybrid Code Networks: practical and efficient end-to-end dialog control with supervised and reinforcement learning", arXiv preprint arXiv:1702.03274v2 [cs.AI] Apr. 24, 2017, 2017, 13 pages.
Wu, et al., "Global-to-Local Memory Pointer Networks for Task-Oriented Dialogue", In 7th International Conference on Learning Representations, ICLR 2019, arXiv:1901.04713v2 [cs.CL] Mar. 29, 2019, 19 pages.
Xiong, et al., "Dynamic Memory Networks for Visual and Textual Question Answering", In International conference on machine learning, 2397-2406. Zhao, T., and Eskenazi, M. 2016. Towards end-to-end learning for dialog state tracking and management using deep reinforcement learning. In Proceedings of the 17th Annual Meeting of the Special Interest Group on Discourse and Dialogue, pp. 1-10, 2016.

* cited by examiner

DIALOG SYSTEM WITH ADAPTIVE RECURRENT HOPPING AND DUAL CONTEXT ENCODING

BACKGROUND

The following relates generally to dialog systems, and more specifically to a dialog system using memory hopping for information retrieval.

Dialog systems are automated systems for dynamically interacting with users using natural language. In many cases, dialog systems perform information retrieval tasks to obtain information from a knowledge base that is relevant to a dialog. Information retrieval refers to the task of extracting information resources based on a query. In some cases, information retrieval includes identifying relevant search objects from a database and comparing the search objects to a query object. For example, a user or a dialog system can provide a text description as a query, and a search engine may find text descriptions, or other media such as images, that are similar or relevant to the query.

In some cases, dialog systems provide specific task-related output through conversation with a user. Generally, the workflow of such dialog systems includes processing inputs using natural language understanding, dialog management, and natural language generation. In a dialog management phase, an external knowledge base can be accessed to find information (e.g., information relevant to a natural language understanding of a user's query) that is used for natural language generation (e.g., to generate responses to the user). In some cases, task-oriented dialog systems implement end-to-end memory networks that perform multi-hop reasoning, which allow the model to perform complex operations via step by step inference (e.g., the memory network may query the knowledge base and refine the response by repeatedly performing memory hops, which calculates attention over memory entries).

Conventional end-to-end memory networks use a fixed number of memory hops (i.e., performing the same number of reasoning steps in all instances of knowledge base response refinement) regardless of the complexity of the relation between the response, the knowledge base, and the dialog context. However, dialog queries differ greatly from each other in complexity, and more complex queries benefit from more reasoning (e.g., more reasoning steps). Therefore, using the same number of memory hops for different queries results in insufficient hopping or in excessive hopping. This degrades the performance of the dialog system. Therefore, there is a need in the art for improved end-to-end memory networks that efficiently handle large variance in terms of the complexity of the relation between the response, the knowledge base, and the dialog context.

SUMMARY

The present disclosure describes systems and methods for dialog processing and information retrieval. Embodiments of the present disclosure provide a dialog system with adaptive recurrent hopping and dual context encoding to receive and understand a natural language query from a user, manage dialog based on natural language conversation, and generate natural language responses. For example, a memory network can employ a memory recurrent neural net layer and a decision meta network (e.g., a subnet) to determine an adaptive number of memory hops for obtaining readouts from a knowledge base. Further, in some embodiments, a memory network uses a dual context encoder to encode information from an original context and a canonical context using parallel encoding layers.

A method, apparatus, non-transitory computer readable medium, and system for dialog system with adaptive recurrent hopping and dual context encoding are described. Embodiments of the method, apparatus, non-transitory computer readable medium, and system are configured to receive a natural language query that relates to information in a knowledge base, perform a first memory hop to obtain a first readout from the knowledge base, determine to perform a second memory hop based on the natural language query and the first readout, perform the second memory hop to obtain a second readout based on the first readout and the determination to perform a second memory hop, and generate a response to the natural language query based on the second memory readout.

An apparatus, system, and method for dialog system with adaptive recurrent hopping and dual context encoding are described. Embodiments of the apparatus, system, and method are configured to to generate an original context representation and a canonical context representation for a natural language query, wherein the original context representation comprises an entity and the canonical context representation comprises an entity type in place of the entity, a memory controller configured to obtain memory readouts from a knowledge base by performing an adaptive number of memory hops based on the natural language query, and a decoder configured to generate a response based on the canonical context representation and the response information.

A method, apparatus, non-transitory computer readable medium, and system for dialog system with adaptive recurrent hopping and dual context encoding are described. Embodiments of the method, apparatus, non-transitory computer readable medium, and system are configured to identify a training set, wherein each item in the training set comprises a natural language query and a ground truth response, predict a response to the natural language query for each item of the training set using a memory network, wherein the memory network performs an adaptive number of memory hops, compute a loss function for each of the memory hops, and train the memory network is to determine the adaptive number of memory hops based on the computed loss functions for each of the memory hops.

DETAILED DESCRIPTION

Figure 1:
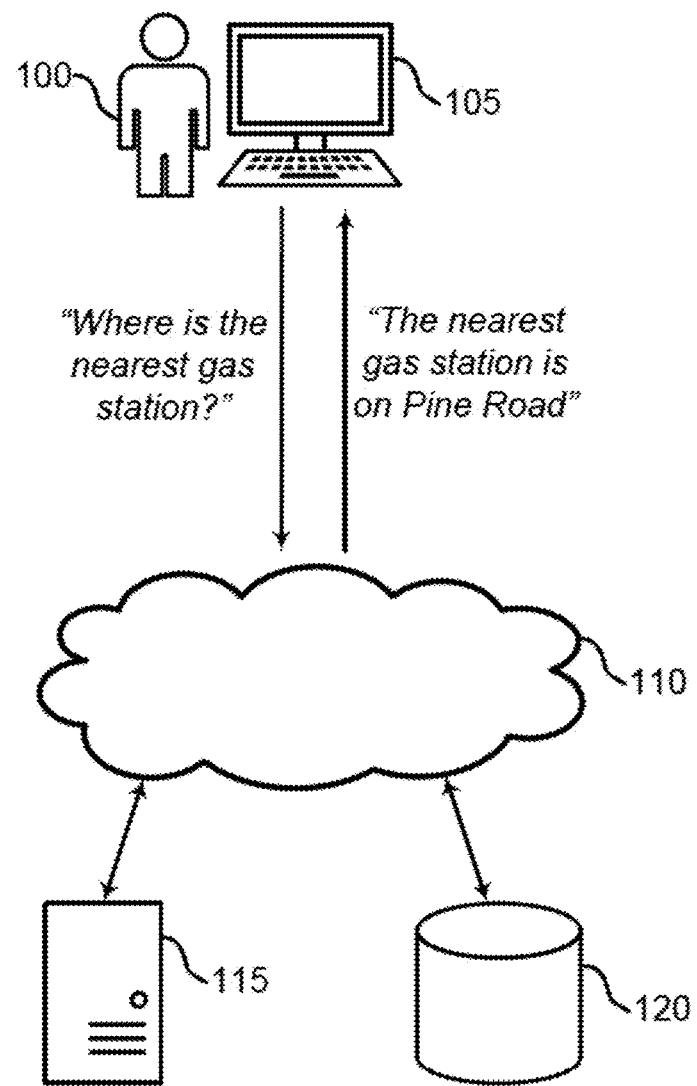
FIG. 1 shows an example of a dialog system according to aspects of the present disclosure.

The present disclosure describes systems and methods for dialog processing and information retrieval. Embodiments of the present disclosure provide a dialog system (e.g., a task-oriented dialog system such as a restaurant reservation agent or a navigation assistant) using a memory network with adaptive recurrent hopping and dual context encoding. For example, a memory network, according to certain embodiments, employs a memory recurrent neural net layer and a decision meta network (e.g., a subnet) to determine an adaptive number of memory hops for obtaining readouts from a knowledge base. As a result, memory hopping can be performed adaptively depending on the input context and query results (e.g., based on the complexity of the relation between the response, the knowledge base, and the dialog context).

Recently, task-oriented dialog systems have employed memory networks that perform multi-hop reasoning. Memory networks perform complex operations by doing step by step inference. However, conventional memory networks use a fixed number of memory hops, and perform the same number of reasoning steps for queries with various levels of complexity. As a result, these networks perform insufficient hopping or in excessive hopping, which can lead to degraded performance. For example, for complex queries, the responses may be inaccurate. For simple queries, the reasoning may be computationally inefficient.

Embodiments of the present disclosure provide an improved dialog system using a memory network with adaptive recurrent hopping and dual context encoding. In some embodiments, the memory network includes a memory recurrent neural net layer and a decision meta network (e.g., a subnet) to determine an adaptive number of memory hops for obtaining readouts from a knowledge base. The determined number of memory hops are used by the memory network to refine obtained readouts to ultimately output a refined readout to a decoder (e.g., for the decoder to generate the system's dialog response).

By applying the unconventional step of adaptively determining a number of memory hops, embodiments of the present disclosure enable dialog systems to provide improved responses to a natural language query via refinement of a number of reasoning steps for queries with various complexities. In some embodiments, dialog systems use a dual context encoder that encodes an original context representation and a canonical context representation using parallel encoding layers. In such embodiments, by encoding two different dialog contexts, dialog systems can efficiently leverage a sentence's structural information and entity positional information in the dialog context.

Embodiments of the present disclosure may be used in the context of a dialog system. For example, a dialog system based on the present disclosure may take natural language text as a query and effectively respond to the query with an action or answer. An example of the inventive concept in the dialog system context is provided with reference to FIGS. 1 and 2. Details regarding the network architecture of the example dialog system are provided with reference to FIGS. 3 and 4. Examples of a process for dual context encoding are provided with references to FIGS. 5 and 6. Examples of a process of adaptive recurrent hopping is provided with reference to FIGS. 7 and 8. A description of the example training process is described with reference to FIG. 9.

Dialog System

FIG. 1 shows an example of a task-oriented dialog system according to aspects of the present disclosure. The example shown includes user 100, device 105, cloud 110, dialog apparatus 115, and database 120. The user 100 communicates with the dialog apparatus 115 via the device 105 and the cloud 110. For example, the user 100 may provide a query such as an audio query. In the example illustrated in FIG. 1, the query includes natural language text. The device 105 transmits the query to the dialog apparatus 115 to generate a natural language response (i.e., information stored within the database 120). In some example, the device 105 communicates with the dialog apparatus via the cloud 110.

Task-oriented dialog systems include conversational agents with a specific goal to achieve through the conversation with the user. In some examples, the workflow of a dialog system includes three main phases: natural language understanding, dialog management, and natural language generation. In the dialog management phase, the device 105 may access an external database 120 to find relevant information when interacting with the user. A modular-based dialog system approach provides different modules that are built to handle each phase separately.

Example embodiments of the present disclosure use the modular-based approach, where a dialog state is designed based on a given task. A dialog apparatus 115 with external memory such as database 120 may be used to store knowledge and dialog history. In some cases, the dialog apparatus 115 selects a response from a set of candidates. In other examples, the model generates natural utterances using sequence-to-sequence modeling.

End-to-end memory networks are used for task-oriented dialog systems and may perform multi-hop reasoning, where a model performs complex operations by doing step by step inference. However, end-to-end memory networks have a fixed number of memory hops, forcing models to perform the same number of reasoning steps in some or all instances. Since complex queries use more reasoning, more reasoning steps are used. The present disclosure provides a dialog system with a memory recurrent neural net layer and a decision meta-network to determine when to stop memory hopping. A memory network in dialog may struggle with encoding entities, where entities can be considered rare phrases. Some methods mask the entities with an entity-type (canonical form) to reduce sparsity. Masking negatively affects neural-based retrieval if the dialog system may deal with an external knowledge base. Additionally, or alternatively, directly encoded entities degrade generalization since many entities are unique in a dialog corpus. The present disclosure uses a dual context system, where the entity is encoded in both an original form and a canonical form.

Accordingly, the present disclosure provides a dialog system receiving input from the dialog history (e.g., the input query "where is the nearest gas station?""). The input may include a current user's utterance, which may be a request for certain information from a knowledge base. The dialog system queries the knowledge base to acquire relevant information to the user's request with consideration to the dialog history. Then, the system generates a response to the user's utterance (e.g., "the nearest gas station is on Pine Road").

The device 105 may be a personal computer, laptop computer, mainframe computer, palmtop computer, personal assistant, mobile device, or any other suitable processing apparatus. In some examples, the device 105 includes software (such as a native application or a web browser) that incorporates a task-oriented dialog system.

A cloud 110 may be a computer network configured to provide on-demand availability of computer system resources, such as data storage and computing power. In some examples, the cloud 110 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, the cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

The dialog apparatus 115 includes a computer implemented network that generates an adaptive number of memory hops for a dialog system. According to some embodiments, the dialog apparatus 115 includes an encoder component, a memory controller, and a decoder component. The encoder component generates context representation of a dialog history. The memory controller receives the context representation and outputs a vector. The decoder receives the output vector and outputs a response for the user. The output vector may indicate a next memory hop and may include hidden context, query vectors, and/or memory readouts.

The dialog apparatus 115 may also include a processor unit, a memory unit, a user interface, and a training component. The training component is used to train the encoder of the retrieval network. Additionally, the dialog apparatus 115 can communicate with the database 120 via the cloud 110. In some cases, the architecture of the dialog apparatus 115 is also referred to as an end-to-end memory network. Further detail regarding the architecture of the dialog apparatus 115 is provided with reference to FIGS. 3 and 4. Further details regarding the operation of the dialog apparatus 115 is provided with reference to FIGS. 5 and 6.

In some cases, the dialog apparatus 115 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some examples, the dialog apparatus 115 is a dialog processing system and/or information retrieval system that performs dialog processing based on content understanding. The dialog apparatus 115 can be used to identify objects, subjects, action, tone, emotion, concepts, aesthetics, style, and media types such as images, videos, documents, composites, etc. Based on information of the content, the dialog apparatus 115 can provide audio and/or text feedback.

In some examples, the dialog apparatus 115 receives natural language as input and represent such information in textual form, where a subsequent response depends on the textual representation. In some cases, the dialog apparatus 115 is able to accurately represent the natural language (e.g., non-textual) using an encoding component. In one embodiment, the dialog apparatus 115 captures text representation irrespective of types of content or information (e.g., image, audio, video, composites, 3D, etc.).

In some embodiments, the dialog apparatus 115 includes a recurrent neural network to generate concatenated context. In some examples, dialog apparatus 115 may include one or more aspects of an artificial neural network. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge are associated with one or more node weights that determine how the signal is processed and transmitted.

During the training process, these weights are adjusted to improve the accuracy of the result (i.e., by minimizing a loss function that corresponds to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, a training component is used to train the memory network. A loss function is used during the training and the parameters of the encoder are iteratively updated based on a comparison. The trained memory network is used to determine the adaptive number of memory hops. Training the memory network will be described in greater detail in FIG. 9.

A database 120 may include an organized collection of data such as a knowledge base. For example, a database 120 stores data in a specified format known as a schema. A database may be structured as a single database, a distributed database, multiple distributed databases, or an emergency backup database. In some cases, a database controller may manage data storage and processing in the database 120. In some cases, a user interacts with database controller. In other cases, database controller may operate automatically without user interaction.

Figure 2:
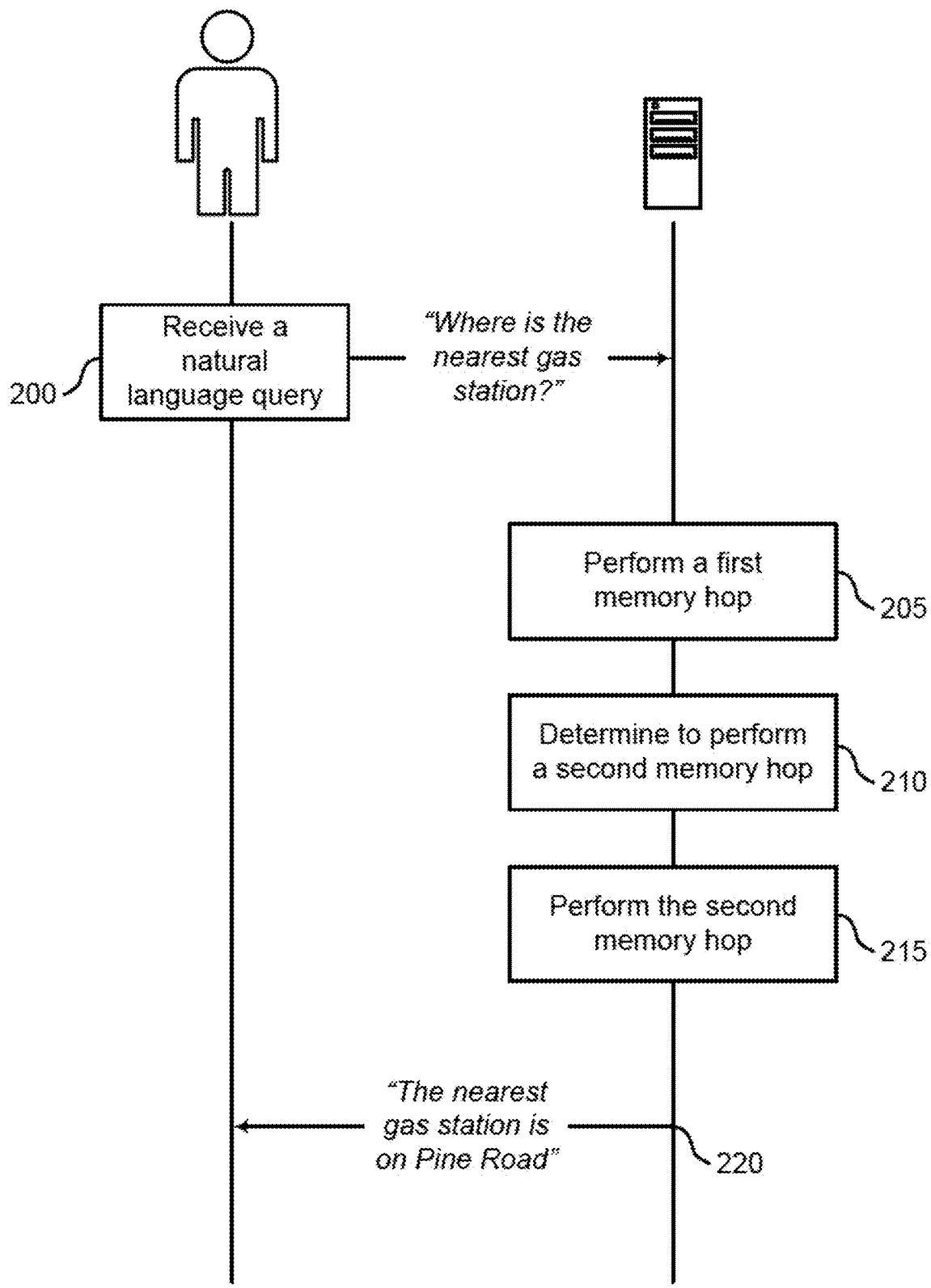
FIG. 2 shows an example of a dialog system flowchart according to aspects of the present disclosure.

FIG. 2 shows an example of a dialog system flowchart according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for dialog system with adaptive recurrent hopping and dual context encoding is described. Embodiments of the method are configured to receive a natural language query that relates to information in a knowledge base and perform a first memory hop to obtain a first readout from the knowledge base. Embodiments of the disclosure are further configured to determine to perform a second memory hop based on the natural language query and the first readout, perform the second memory hop to obtain a second readout based on the first readout and the determination to perform a second memory hop, and generate a response to the natural language query based on the second memory readout.

At operation 200, the system receives a natural language query that relates to information in a knowledge base. In some cases, the operations of this step refer to, or may be performed by, a user interface as described with reference to FIG. 3.

At operation 205, the system performs a first memory hop to obtain a first readout from the knowledge base. In some cases, the operations of this step refer to, or may be performed by, a memory controller as described with reference to FIGS. 3, 4, and 6.

At operation 210, the system determines to perform a second memory hop based on the natural language query and the first readout. In some cases, the operations of this step refer to, or may be performed by, a memory controller as described with reference to FIGS. 3, 4, and 6.

At operation 215, the system performs the second memory hop to obtain a second readout based on the first readout and the determination to perform a second memory hop. In some cases, the operations of this step refer to, or may be performed by, a memory controller as described with reference to FIGS. 3, 4, and 6.

At operation 220, the system generates a response to the natural language query based on the second memory readout. In some cases, the operations of this step refer to, or may be performed by, a decoder component as described with reference to FIG. 3.

An example of a dialog task may proceed as follows:

User: Car, I need a hospital. Please send me a quick route to the one near me in the direction we are driving.

System: Stanford Express Care is on the way.

User: Please pick a quick route and let's go there, thank you!

System: Navigating to Stanford_express_care at 214 El_Camino_Real. There is heavy traffic on the way.

User: Okay, thanks car!

System: You are very welcome

Related to the example dialog task above, the knowledge base may include information such as: 2 miles heavy traffic pizza restaurant poi pizza hut; pizza hut distance 2 miles; pizza hut traffic info heavy traffic; pizza hut poi type pizza restaurant; pizza hut address 704 el camino real; 6 miles heavy traffic hospital poi stanford express care; stanford express care distance 6 miles; stanford express care traffic info heavy traffic; stanford express care poi type hospital; and stanford express care address 214 el camino real, among other examples.

A non-transitory computer readable medium storing code for memory network with adaptive recurrent hopping and dual context encoding is described. In some examples, the code comprises instructions executable by a processor to: receive a natural language query that relates to information in a knowledge base, perform a first memory hop to obtain a first readout from the knowledge base, determine to perform a second memory hop based on the natural language query and the first readout, perform the second memory hop to obtain a second readout based on the first readout and the determination to perform a second memory hop, and generate a response to the natural language query based on the second memory readout.

A system for dialog system with adaptive recurrent hopping and dual context encoding is described. Embodiments of the system are configured to receiving a natural language query that relates to information in a knowledge base, performing a first memory hop to obtain a first readout from the knowledge base, determining to perform a second memory hop based on the natural language query and the first readout, performing the second memory hop to obtain a second readout based on the first readout and the determination to perform a second memory hop, and generating a response to the natural language query based on the second memory readout.

Some examples of the method, apparatus, non-transitory computer readable medium, and system described above further include iteratively performing memory hops when a subnet outputs an indication to continue. Some examples further include terminating the memory hops when the subnet outputs an indication to terminate.

Some examples of the method, apparatus, non-transitory computer readable medium, and system described above further include generating an original context representation based on the natural language query, wherein the first memory readout is obtained using the original context representation. Some examples further include replacing an entity in the natural language query with an entity type to generate a canonical query. Some examples further include generating a canonical context representation based on the canonical query, wherein the response is generated based on the original context representation and the canonical context representation.

Network Architecture

Figure 3:
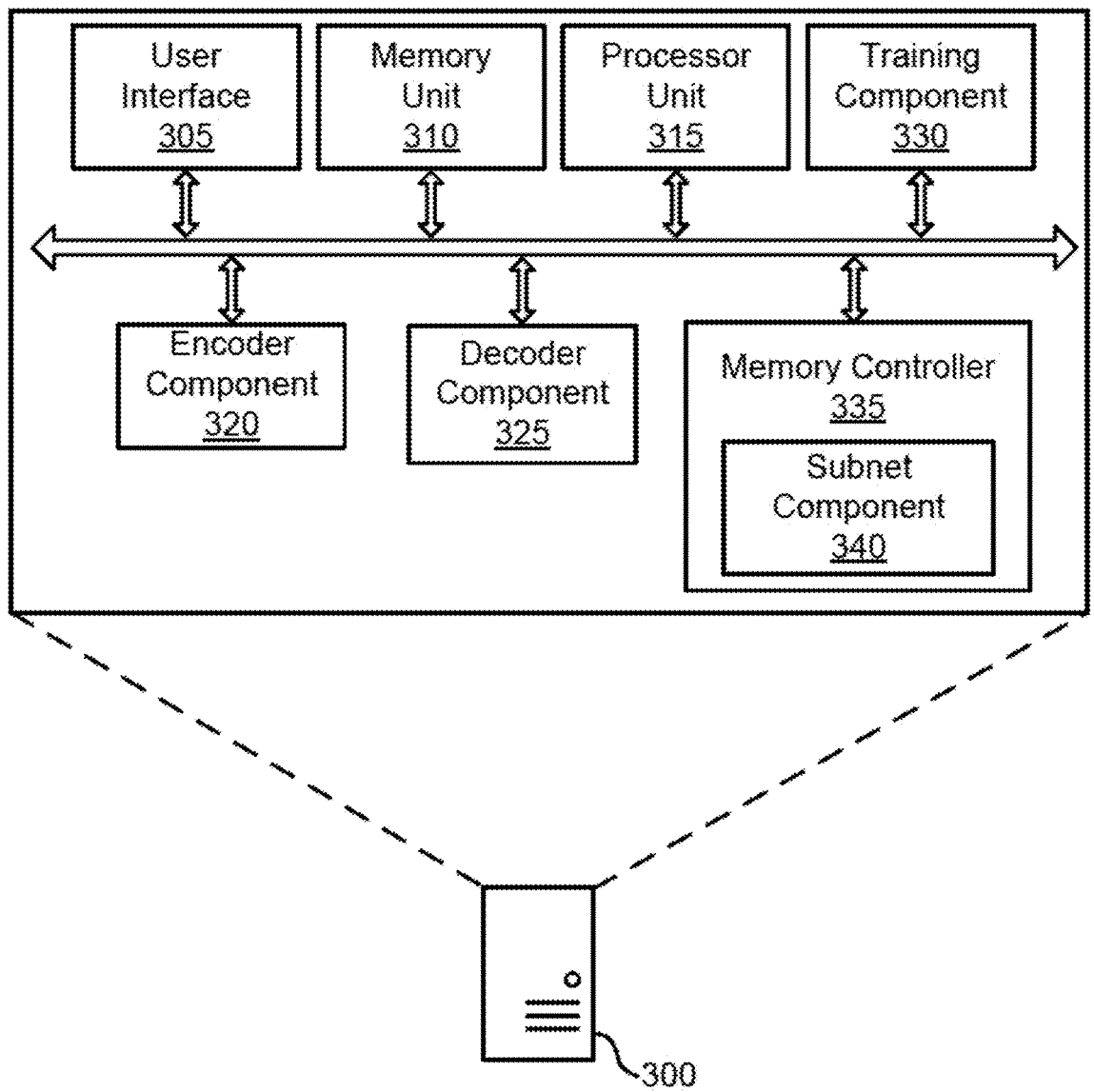
FIG. 3 shows an example of a dialog system apparatus according to aspects of the present disclosure.

FIG. 3 shows an example of a dialog system apparatus 300 according to aspects of the present disclosure. In one embodiment, dialog system apparatus 300 includes user interface 305, memory unit 310, processor unit 315, encoder component 320, decoder component 325, training component 330, and memory controller 335.

An apparatus for dialog system with adaptive recurrent hopping and dual context encoding is described. Embodiments of the apparatus include an encoder component 320 configured to generate an original context representation and a canonical context representation for a natural language query, where the original context representation comprises an entity and the canonical context representation comprises an entity type in place of the entity. Embodiments of the apparatus further include a memory controller 335 configured to obtain memory readouts from a knowledge base by performing an adaptive number of memory hops based on the natural language query. Embodiments of the apparatus further include a decoder component 325 configured to generate a response based on the canonical context representation and the response information.

According to some embodiments, user interface 305 receives a query from a user. In some examples, user interface 305 receives a text query or an audible query. After running a search to produce a response, the user interface 305 presents the response object to a user. In some cases, the response is not limited to an utterance and may include more than one utterance. In some examples, the query is an audible query spoken to the dialog system apparatus 300. The response is also an audible utterance that corresponds to the query (e.g., an answer to a question).

A processor unit 315 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 315 is configured to operate a memory array using a memory controller. In other cases, a memory controller is integrated into the processor unit 315. In some cases, the processor unit 315 is configured to execute computer-readable instructions stored in a memory to perform various functions. In some embodiments, the processor unit 315 includes special purpose components for modem processing, baseband processing, digital signal processing, or transmission processing.

Examples of a memory unit 310 include random access memory (RAM), read-only memory (ROM), or a hard disk. Examples of memory unit 310 include solid state memory and a hard disk drive. In some examples, memory unit 310 is used to store computer-readable, computer-executable software including instructions that, when executed, cause a processor to perform various functions described herein. In some cases, the memory unit 310 contains, among other things, a basic input/output system (BIOS) that controls basic hardware or software operation such as the interaction with peripheral components or devices. In some cases, a memory controller operates memory cells. For example, the memory controller can include a row decoder, column decoder, or both. In some cases, memory cells within a memory unit 310 store information in the form of a logical state.

An apparatus for memory network with adaptive recurrent hopping and dual context encoding is described. The apparatus includes a processor, memory in electronic communication with the processor, and instructions stored in the memory. The instructions are operable to cause the processor to receive a natural language query that relates to information in a knowledge base, perform a first memory hop to obtain a first readout from the knowledge base, determine to perform a second memory hop based on the natural language query and the first readout, perform the second memory hop to obtain a second readout based on the first readout and the determination to perform a second memory hop, and generate a response to the natural language query based on the second memory readout.

In an example embodiment, the present disclosure includes a memory controller 335 with a subnet 340 that learns to select the optimal number of memory hops based on the loss calculated during training. Therefore, the model of the present disclosure can perform memory hopping adaptively depending on the input context and query results.

According to some embodiments, user interface 305 receives a natural language query that relates to information in a knowledge base. In some examples, the knowledge base is queried based on an adaptive number of memory hops. In some examples, user interface 305 receives a dialog history including a set of entries including the natural language query.

Some examples of the method, apparatus, non-transitory computer readable medium, and system described above further include receiving a dialog history comprising a plurality of entries including the natural language query.

According to some embodiments, user interface 305 be configured to receive the natural language query and display the response.

According to some embodiments, encoder component 320 generates an original context representation based on the natural language query, where the first memory readout is obtained using the original context representation. In some examples, encoder component 320 replaces an entity in the natural language query with an entity type to generate a canonical query. In some examples, encoder component 320 generates a canonical context representation based on the canonical query, where the response is generated based on the original context representation and the canonical context representation. In some examples, encoder component 320 identifies the entity type based on the entity. Additionally, or alternatively, some examples of the method, apparatus, non-transitory computer readable medium, and system described above further include identifying the entity type based on the entity.

According to some embodiments, encoder component 320 comprise an encoder configured to generate an original context representation and a canonical context representation for a natural language query, where the original context representation includes an entity and the canonical context representation includes an entity type in place of the entity. In some examples, the encoder is further configured to provide an iterative output for performing the memory hops. In some examples, the encoder includes a recurrent neural network (RNN) with a gated recurrent unit (GRU) cell.

An RNN is a class of ANN in which connections between nodes form a directed graph along an ordered (i.e., a temporal) sequence. This enables an RNN to model temporally dynamic behavior, such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

A GRU is a variant of a RNN. The GRU is able to process memories of sequential data by storing previous inputs in the internal state of networks and map from a history of previous inputs to target vectors. Additionally, a GRU is similar to a Long Short-Term Memory (LSTM), but does not include an output gate.

The model of the present disclosure follows is a KB-based dialog system, which contains three components: an encoder component 320, a decoder component 325, and a memory controller 335 (to query the knowledge base). The encoder component 320, the decoder component 325, and the memory controller 335 are connected and the model is end-to-end trainable. The knowledge base is denoted as $B=(b_1, b_2, \ldots, b_M)$, the dialog context (history) as $X=(x_1, x_2, \ldots, X_N)$, and the response of the system as $Y=(y_1, y_2, \ldots, y_L)$.

In an example embodiment of the present disclosure, the encoder component 320 may include a dual context encoder to encode information from different dialog contexts. The different dialog contexts may be original context and canonical context. The canonical context includes entity word tokens replaced by an entity type. The encoder receives input from these contexts and outputs two separate encoded hidden dialog contexts. Such strategy provides for the encoder to efficiently use the sentence's structural information and entity positional information in the dialog context.

According to some embodiments, decoder component 325 generates a response to the natural language query based on the second memory readout. In some examples, decoder component 325 generates a canonical response frame that includes an entity type. In some examples, decoder component 325 queries the knowledge base based on the entity type to obtain a replacement entity. In some examples, decoder component 325 replaces the entity type with the replacement entity to obtain the response.

Some examples of the method, apparatus, non-transitory computer readable medium, and system described above further include generating a canonical response frame that includes an entity type. Some examples further include querying the knowledge base based on the entity type to obtain a replacement entity. Some examples further include replacing the entity type with the replacement entity to obtain the response.

According to some embodiments, decoder component 325 comprise a decoder configured to generate a response based on the canonical context representation and the response information. In some examples, the decoder includes an RNN with a GRU cell.

According to some embodiments, training component 330 identifies a training set, where each item in the training set includes a natural language query and a ground truth response. In some examples, training component 330 predicts a response to the natural language query for each item of the training set using a memory network, where the memory network performs an adaptive number of memory hops. In some examples, training component 330 computes a loss function for each of the memory hops. In some examples, training component 330 trains the memory network is to determine the adaptive number of memory hops based on the computed loss functions for each of the memory hops. In some examples, training component 330 updates parameters of a subnet based on the loss function computed for each of the memory hops, where the subnet is configured to determine the adaptive number of memory hops. In some examples, training component 330 computes a vocabulary loss based on the ground truth response, where the loss function is based on the vocabulary loss. In some examples, training component 330 computes a memory pointer loss based on an entity used by a decoder of the memory network to replace an entity type in the response, where the loss function is based on the memory pointer loss. In some examples, training component 330 computes a pointer loss based on a pointer label at each of a set of steps of a decoder, where the loss function is based on the pointer loss.

According to some embodiments, memory controller 335 performs a first memory hop to obtain a first readout from the knowledge base. In some examples, memory controller 335 determines to perform a second memory hop based on the natural language query and the first readout. In some examples, memory controller 335 performs the second memory hop to obtain a second readout based on the first readout and the determination to perform a second memory hop. In some examples, memory controller 335 identifies a first vector for performing the first memory hop based on the natural language query. In some examples, memory controller 335 generates a second vector based on the first readout using an encoder of a memory network, where the second memory hop is performed based on the second vector. In some examples, memory controller 335 determines not to perform a third memory hop based on the second readout. In some examples, memory controller 335 generates an output vector based on the second readout, where the response is generated based on the output vector. In some examples, memory controller 335 Iteratively performs memory hops when a subnet outputs an indication to continue. In some examples, memory controller 335 terminates the memory hops when the subnet outputs an indication to terminate.

In some examples, the knowledge base is queried based on an adaptive number of memory hops. According to some embodiments, memory controller 335 be configured to obtain memory readouts from a knowledge base by performing an adaptive number of memory hops based on the natural language query. In some examples, the memory controller 335 includes a subnet configured to provide an indication of whether to perform an additional memory hop, where the adaptive number of memory hops is based on the indication.

Memory controller 335 is an example of, or includes aspects of, the corresponding element described with reference to FIGS. 4 and 6.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media, including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

A system for memory network with adaptive recurrent hopping and dual context encoding, comprising: an encoder configured to generate an original context representation and a canonical context representation for a natural language query, wherein the original context representation comprises an entity and the canonical context representation comprises an entity type in place of the entity, a memory controller configured to obtain memory readouts from a knowledge base by performing an adaptive number of memory hops based on the natural language query, and a decoder configured to generate a response based on the canonical context representation and the response information.

A method of manufacturing an apparatus for memory network with adaptive recurrent hopping and dual context encoding is described. The method includes manufacturing an encoder configured to generate an original context representation and a canonical context representation for a natural language query, where the original context representation comprises an entity and the canonical context representation comprises an entity type in place of the entity. The method further includes manufacturing a memory controller configured to obtain memory readouts from a knowledge base by performing an adaptive number of memory hops based on the natural language query and manufacturing a decoder configured to generate a response based on the canonical context representation and the response information.

A method of using an apparatus for memory network with adaptive recurrent hopping and dual context encoding is described. The method includes using an encoder configured to generate an original context representation and a canonical context representation for a natural language query, where the original context representation comprises an entity and the canonical context representation comprises an entity type in place of the entity. The method further includes using a memory controller configured to obtain memory readouts from a knowledge base by performing an adaptive number of memory hops based on the natural language query and using a decoder configured to generate a response based on the canonical context representation and the response information.

In some examples, the memory controller comprises a subnet configured to provide an indication of whether to perform an additional memory hop, wherein the adaptive number of memory hops is based on the indication. In some examples, the encoder is further configured to provide an iterative output for performing the memory hops. In some examples, the encoder comprises an RNN with a GRU cell. In other examples, the decoder comprises an RNN with a GRU cell. Some examples of the apparatus, system, and method described above further include a user interface configured to receive the natural language query and display the response.

Figure 4:
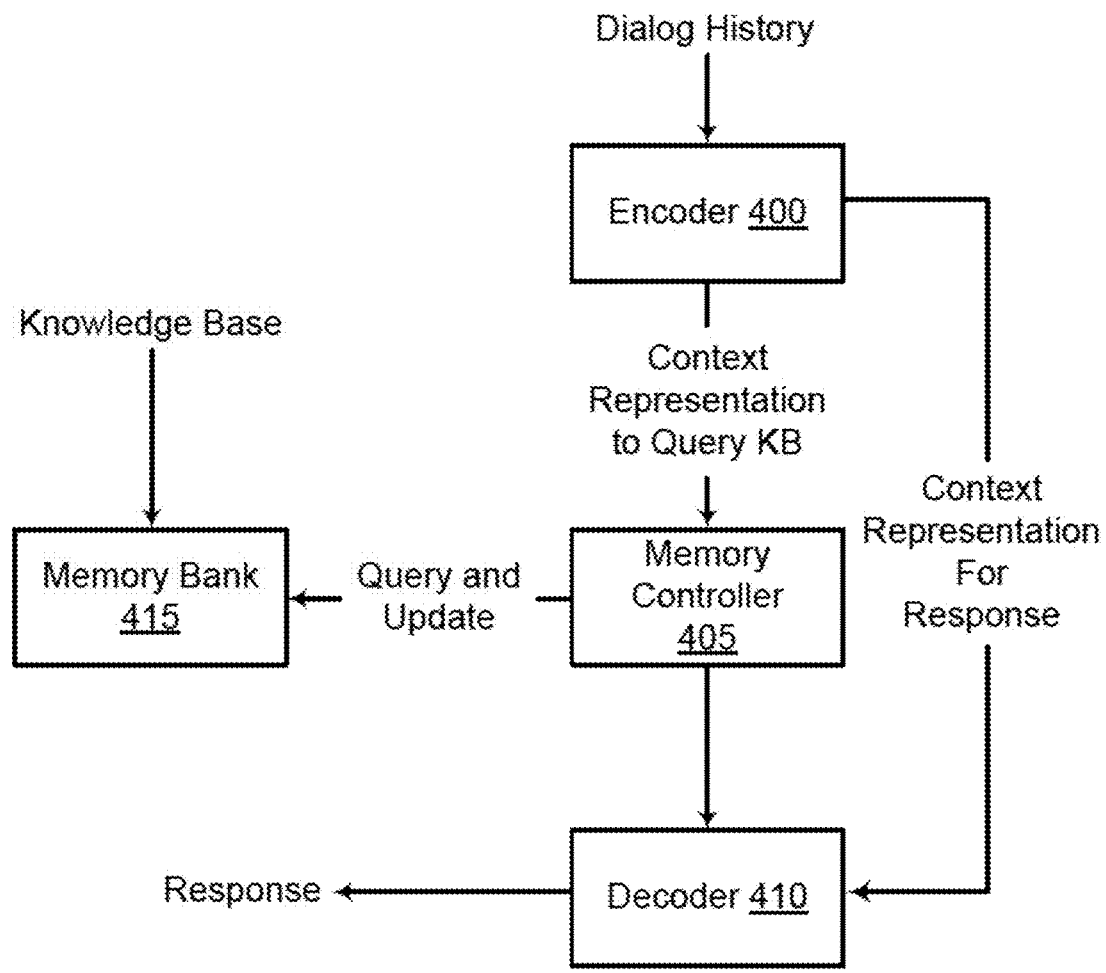
FIG. 4 shows an example of the computation flow of a dialog system according to aspects of the present disclosure.

FIG. 4 shows an example of the computation flow of a dialog system according to aspects of the present disclosure. The example shown includes encoder 400, memory controller 405, decoder 410, and memory bank 415. Memory controller 405 is an example of, or includes aspects of, the corresponding element described with reference to FIGS. 3 and 6. Decoder 410 is an example of, or includes aspects of, the corresponding element described with reference to FIGS. 6 and 8.

In an example scenario, dialog history is input into the encoder 400. The knowledge base is embedded into distributed representations and is embedded by an embedding matrix from a bag-of-word representation. The dialog history is then embedded by the encoder 400 into a dialog context vector to query the knowledge base and provide context to generate a response. Dialog context is used to query the knowledge base. Querying the knowledge base is governed by the encoder 400. Context to query the knowledge base is received by the memory controller 405, where the memory controller 405 then queries and updates the memory bank 415. The encoder 400 outputs context representations for a response, which is input to the decoder 410. The decoder 410 is also input by an output vector from the memory controller. The output vector may include a canonical representation of the context representation. An RNN may be used to generate the response using the information from the knowledge base query and context embedding processes.

In an example scenario shown in FIG. 4, dialog history is input to the encoder 400. The encoder 400 outputs dialog to the knowledge base and context representation to the memory controller 405. The memory controller 405 is an example of, or includes aspects of, the corresponding element described with reference to FIGS. 3 and 6. The memory controller outputs the knowledge base readout (e.g., a vector $q^{k+1}$, as described in more detail herein) to the decoder 410 and provides a response to the user. Additionally, the memory controller outputs a query and update to the memory bank 415. Context representation is input from the encoder 400 to the decoder 410.

Dual Context Encoding

Figure 5:
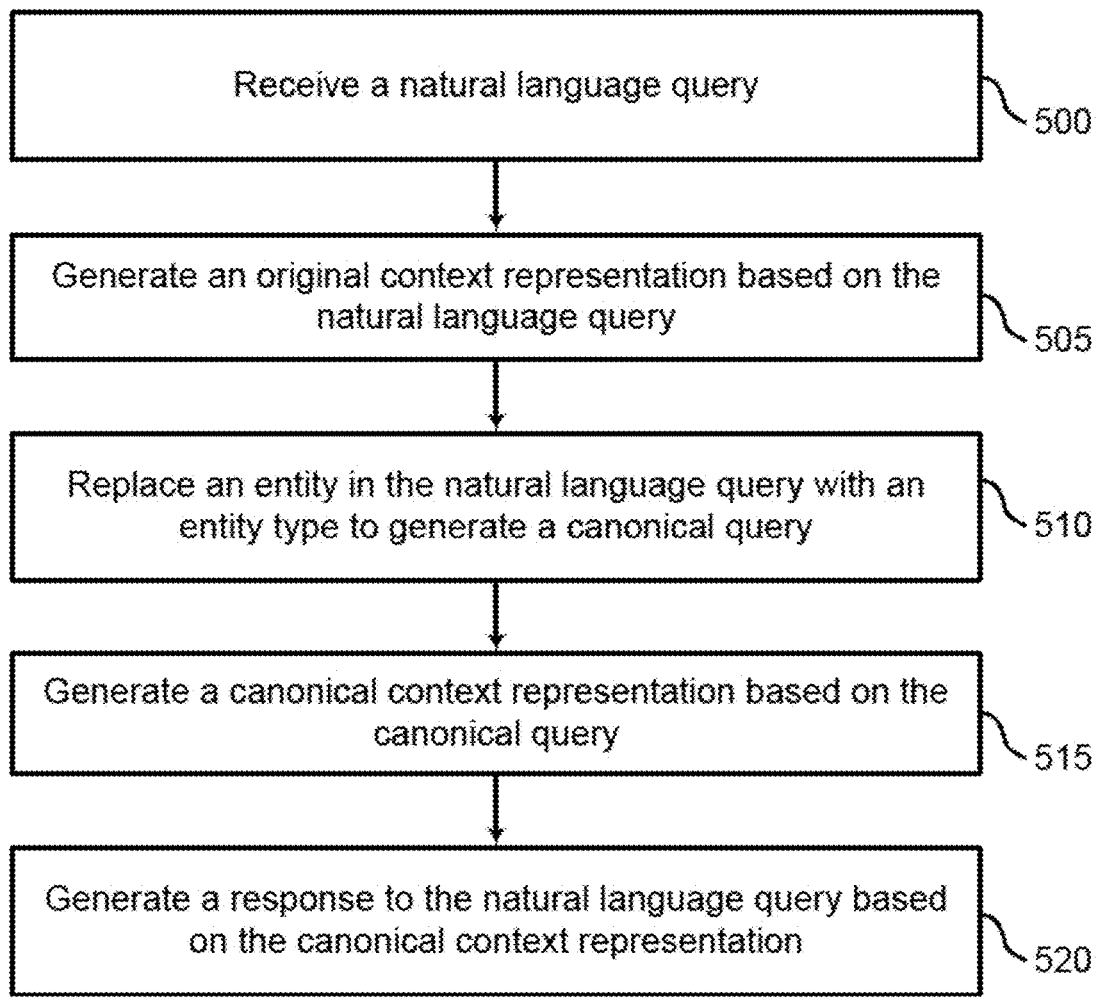
FIG. 5 shows an example of a process for dual context encoding according to aspects of the present disclosure.

FIG. 5 shows an example of a process for dual context encoding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The dual context encoder of the present disclosure encodes information from two different dialog context representations (e.g., original context representations and canonical context representations). The present disclosure uses a bidirectional RNN with a GRU cell as the encoder.

At operation 500, the system receives a natural language query (e.g., a natural language query that relates to information in a knowledge base). In some cases, the operations of this step refer to, or may be performed by, a user interface as described with reference to FIG. 3. The natural language query may be a question or statement from a user to the system.

At operation 505, the system generates an original context representation based on the natural language query, where the first memory readout is obtained using the original context representation. In some cases, the operations of this step refer to, or may be performed by, an encoder component as described with reference to FIG. 3.

At operation 510, the system replaces an entity in the natural language query with an entity type to generate a canonical query. In some cases, the operations of this step refer to, or may be performed by, an encoder component as described with reference to FIG. 3.

At operation 515, the system generates a canonical context representation based on the canonical query, where the response is generated based on the original context representation and the canonical context representation. The canonical context has entity word tokens replaced by an entity type. In some cases, the operations of this step refer to, or may be performed by, an encoder component as described with reference to FIG. 3.

At operation 520, the system generates a response to the natural language query based on the canonical context representation. In some cases, the operations of this step refer to, or may be performed by, a decoder component as described with reference to FIG. 3.

Figure 6:
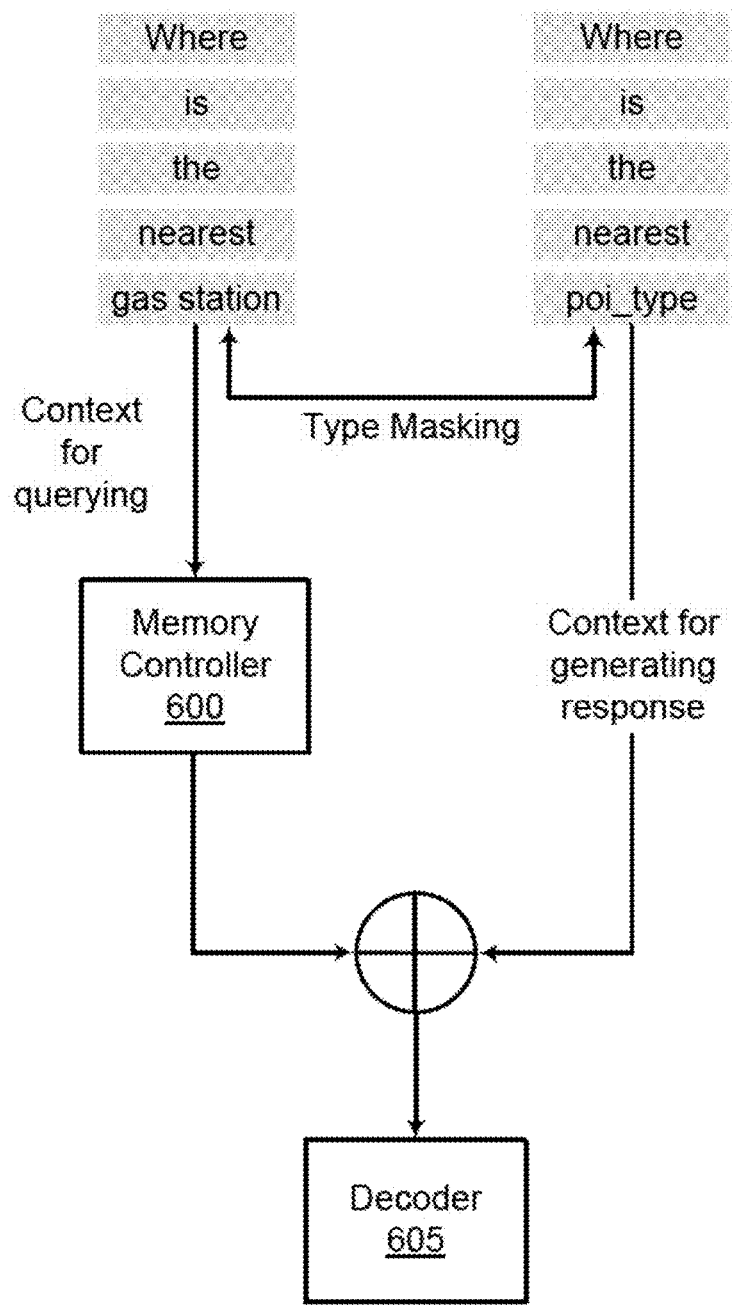
FIG. 6 shows an example of a process for dual context encoding according to aspects of the present disclosure.

FIG. 6 shows an example of a process for dual context encoding according to aspects of the present disclosure. The example shown includes memory controller 600 and decoder 605. Memory controller 600 is an example of, or includes aspects of, the corresponding element described with reference to FIGS. 3 and 4. Decoder 605 is an example of, or includes aspects of, the corresponding element described with reference to FIGS. 4 and 8.

As described herein, in some embodiments, dialog systems may additionally or alternatively use a dual context encoder that encodes an original context representation and a canonical context representation using parallel encoding layers. In such embodiments, dialog systems can efficiently leverage a sentence's structural information and entity positional information in the dialog context. In the example of FIG. 6, an original context representation (e.g., such as "Where is the nearest gas station") and a canonical context representation (e.g., such as "Where is the nearest poi_type) are illustrated. The contextual phrase "Where is the nearest gas station" is input to the memory controller as context for querying. Type masking is applied to the poi_type (i.e., gas station) to produce context for generating a response. The memory controller outputs context and the context for generating a response are input to an RNN to produce canonical context to the decoder 605.

The encoder receives input from the original context and outputs an original hidden context, represented by query "Where is the nearest gas station (poi_type)" in FIG. 6. The hidden context is used for querying the knowledge base. The original context is converted into canonical form by replacing the words in the context with an entity type from a global entity list. In an example scenario, the phrase "The road to jacks house has no traffic" is converted into "The road to @poi has @traffic/info". The second context is referred to as canonical context. If an entity word is out-of-vocabulary, the entity word is not changed in the canonical context. Additionally, if a word appears twice in the global entity list, the entity type of the first appearance is used. The canonical context is encoded into a canonical hidden context, which is used later for constructing the input for decoding step. In principle, the original context captures entity information while the canonical context contains information regarding the sentence structures and entity positions of the input dialog history. Therefore, the original hidden context is used for querying the knowledge base while the canonical hidden context is used for constructing the encoder's input. The dual context encoding strategy may improve the coherence of the generated responses.

Entity typing is an effective method to reduce sparsity in dialog systems. In frame-based dialogs, the semantic frames are formed with entities masked by entity-type. For example, a sentence: "I go to work at 7 am", can be fed into the dialog management system as "I go to work at TIME", where the entity (7 am) is replaced by a type (TIME). The data sparsity is reduced in training dialog management systems. In many cases, however, entity typing information is not sufficient, for example, querying a knowledge base uses the original entity form. Therefore, some methods choose to encode the original entity form. Jointly encoding both the utterance with original entities and the one with masked entities is possible using two parallel encoding layers.

Adaptive Recurrent Hopping

Figure 7:
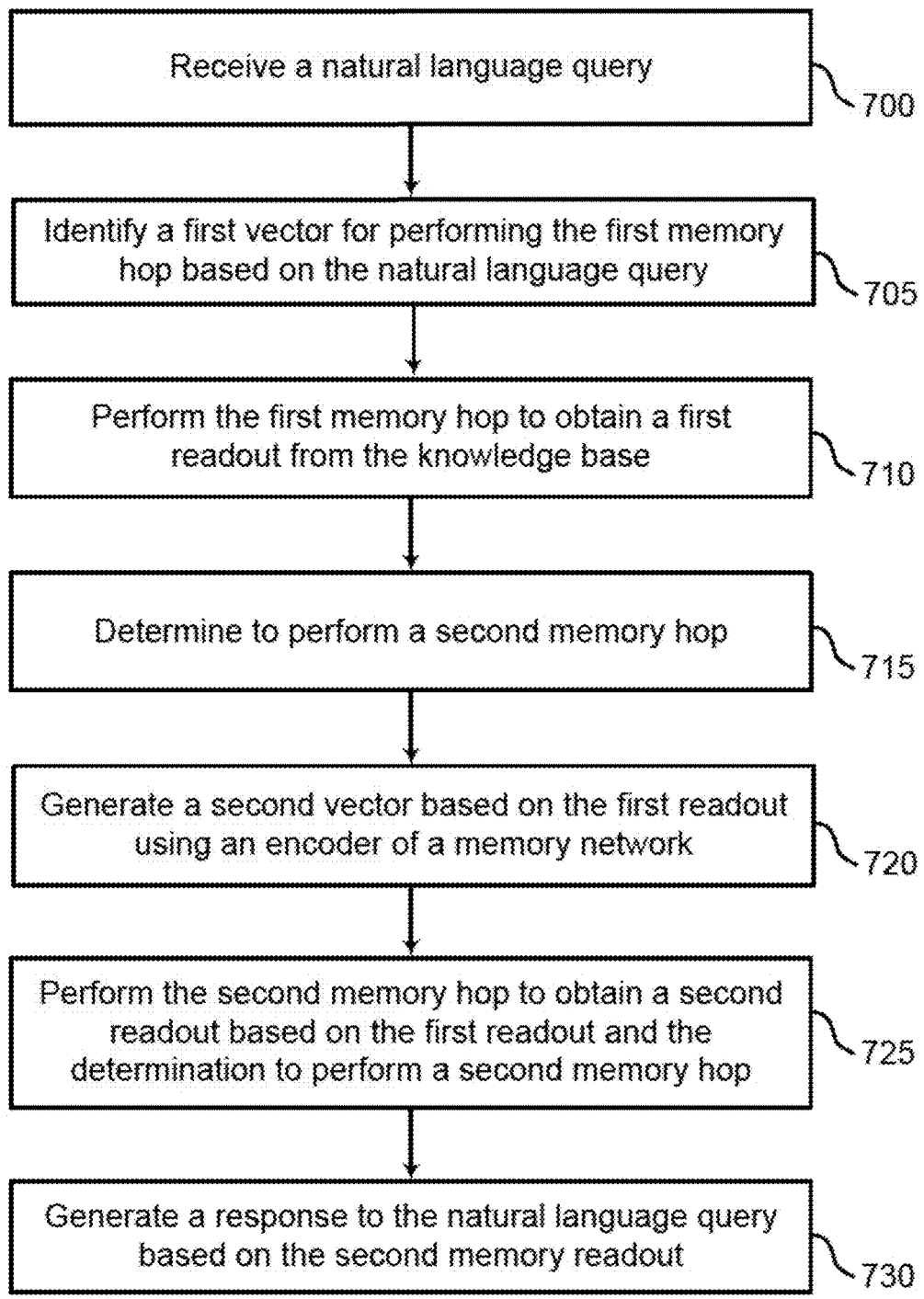
FIG. 7 shows an example of a process for adaptive recurrent hopping according to aspects of the present disclosure.

FIG. 7 shows an example of a process for adaptive recurrent hopping according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives a natural language query (e.g., a natural language query that relates to information in a knowledge base). In some cases, the operations of this step refer to, or may be performed by, a user interface as described with reference to FIG. 3.

At operation 705, the system identifies a first vector for performing the first memory hop based on the natural language query. In some cases, the operations of this step refer to, or may be performed by, a memory controller as described with reference to FIGS. 3, 4, and 6.

At operation 710, the system performs the first memory hop (e.g., to obtain a first readout from the knowledge base) based on the first vector. In some cases, the operations of this step refer to, or may be performed by, a memory controller as described with reference to FIGS. 3, 4, and 6.

At operation 715, the system determines to perform a second memory hop based on the natural language query and the first readout. In some cases, the operations of this step refer to, or may be performed by, a memory controller as described with reference to FIGS. 3, 4, and 6.

At operation 720, the system generates a second vector based on the first readout using an encoder of a memory network. In some cases, the operations of this step refer to, or may be performed by, a memory controller as described with reference to FIGS. 3, 4, and 6.

At operation 725, the system performs the second memory hop to obtain a second readout based on the second vector. In some cases, the operations of this step refer to, or may be performed by, a memory controller as described with reference to FIGS. 3, 4, and 6.

At operation 730, the system generates a response to the natural language query based on the second memory readout. In some cases, the operations of this step refer to, or may be performed by, a decoder component as described with reference to FIG. 3.

At operation 730, the system generates a second vector based on the first readout using an encoder of a memory network, where the second memory hop is performed based on the second vector. In some cases, the operations of this step refer to, or may be performed by, a memory controller as described with reference to FIGS. 3, 4, and 6.

Figure 8:
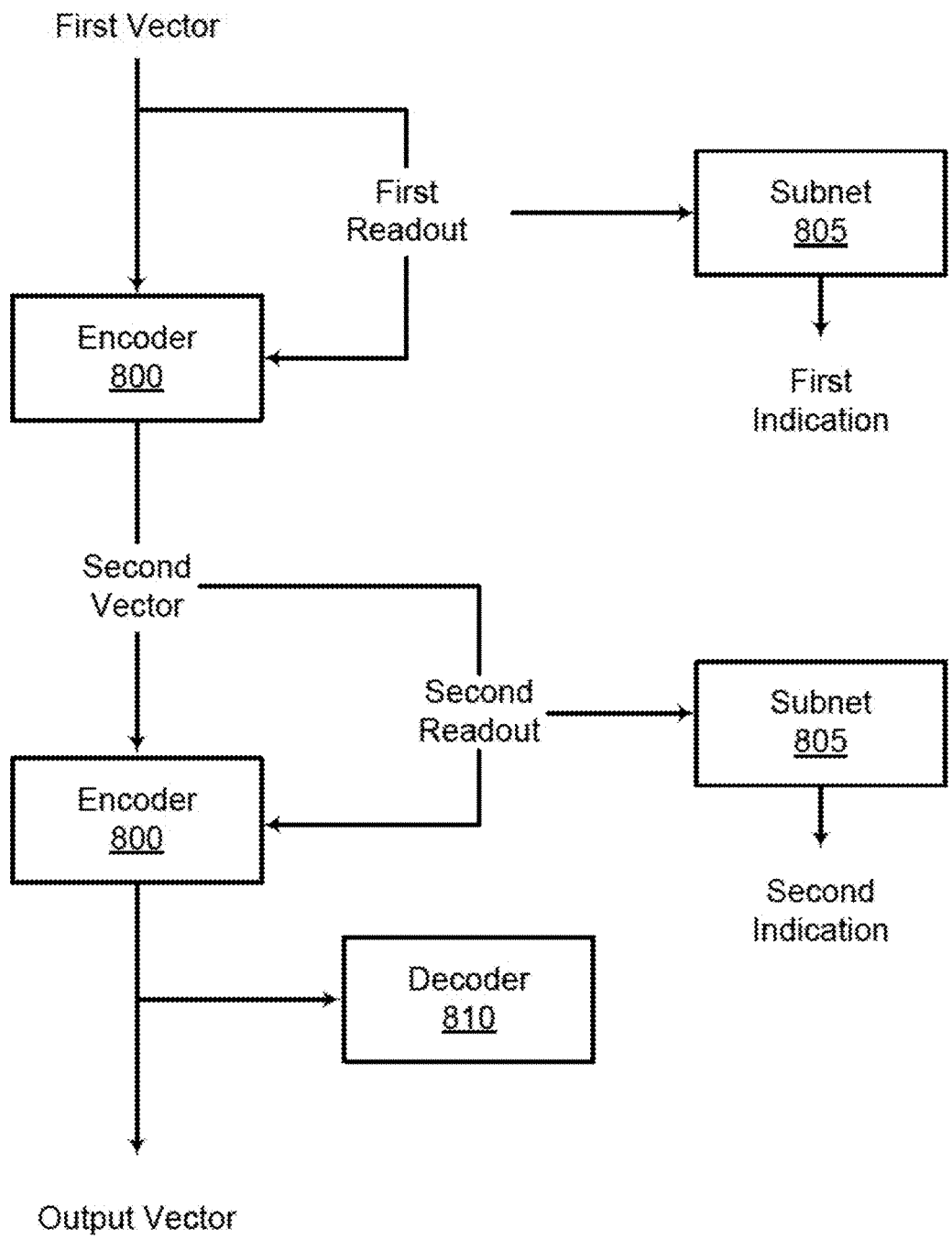
FIG. 8 shows an example of a subnet system according to aspects of the present disclosure.

FIG. 8 shows an example of subnet system according to aspects of the present disclosure. The example shown includes encoder 800, subnet 805, decoder 810, a first vector, a first readout, a first indication, a second vector, a second readout, a second indication, and an output vector. Decoder 810 is an example of, or includes aspects of, the corresponding element described with reference to FIGS. 4 and 6.

In a memory network, the querying process includes multiple repeated operations, called memory hop. A memory hop includes obtaining a readout from a knowledge base, where subsequent hops can be performed to refine a previous readout. In the example of FIG. 8, two memory hops are shown. For instance, a first vector is fed to a memory network and a first readout is obtained via a first memory hop. The first read out is passed to encoder 800, where the first read out is encoded into a second vector. The second vector may then be used to obtain a second read out via a second hop.

The first vector may be a sentence and could be represented in text and may be in vector form and, in some instances, the first vector may be words.

In a Memory Network, the querying process contains multiple repeated operations, called memory hop. The memory embedding parameters is denoted as $(C^1, C^2, \ldots, C^{K+1})$, where K is the maximum number of memory hops. Each entry b in the knowledge base B is encoded into memory entry representation m as below:

$$m_i^k = C^k(b_i) \quad (1)$$

The attention weights $p_i$ over the memory entry $m_i$ are computed at each memory hop k:

$$p_i^k = \text{softmax}(q^k m_i^k) \quad (2)$$

Note that the initial query vector $q^1$ is the original hidden context, which is the last hidden state from the RNN encoder. The output of the knowledge base readout at hop k is the weighted sum of memory entries in the knowledge base using memory attention $p_i$ in Equation 2:

$$o^k = \Sigma_{i=1}^M (p_i^k m_i^k) \quad (3)$$

The query for the next hop k+1 is given by:

$$q^{k+1} = q^k + o^k \quad (4)$$

The memory hopping process is repeated until a maximum number of hops K is reached. Finally, the vector $q^{k+1}$ is the output of the knowledge base querying process and used as input for the decoder to generate the system's response.

The original update for the query vector $q^k$ as in Equation 4 provides a simple way to aggregate information across query vectors $q^k$ and knowledge base readouts $o^k$. However, such a "naive" update may be inefficient, and a regulation mechanism is used for memory updates, especially when a maximum number of hops K is high.

Therefore, an RNN may be used to handle the query vector update at hop k. GRU is used with the input at time step k is the memory readout $o^k$ and the output hidden state is the query vector $q^k$:

$$q^{k+1} = h_{memory}^{k+1} = \text{GRU}(o^{k+1}, q^k) \quad (5)$$

The use of an RNN for knowledge base querying provides the ability to retain information from the hidden context, the query vectors, and memory readouts. Therefore, such use of the RNN can improve the quality of the generated response.

Some methods in Memory Networks perform Knowledge base querying with the same number of hops regardless of contexts. However, since different dialog situations have varying degrees of complexity, the optimal number of hops may be varied depending on the input context. Therefore, the present disclosure uses a meta network, learning to perform memory hopping in an adaptive manner.

The meta network predicts a hop label $h^k \in \{0,1\}$ at each hop k.

$$h^k = \begin{cases} 0, & \text{if } k < k\_min \\ 1, & \text{otherwise} \end{cases} \quad (6)$$

$$k\_min = \text{argmin}(\mathcal{L}^k)$$

with $\mathcal{L}^k$ is the total loss if the querying process is stopped at memory hop k. During training, the Memory Network is trainer to perform Knowledge base querying with different number of hops. Therefore, the parameters of the network are updated using gradients calculated from a loss, where the loss is a combination of $\mathcal{L}^k$:

$$\mathcal{L} = \mathcal{L}^1 + \mathcal{L}^2 + \ldots \mathcal{L}^k \quad (7)$$

The weight parameters $\theta^{meta}$ of the meta network are also trained for each hop k using softmax cross-entropy loss:

$$h_{out}^k = \text{softmax}(W_k(o_k) + b_k) \quad (8)$$

$$\mathcal{L}_h^k = \log(h_{out}^k) \times h^k + \log(1 - h_{out}^k) \times (1 - h^k)$$

The gradient from the meta loss is propagated through the meta network, the memory embedding matrices, and the encoder. The meta network is considered a binary classifier that predicts the hop label and decides when to stop the querying. During the evaluation, if the predicted label $h_k$predict=0, memory hopping is continued, otherwise querying is stopped, and the decoding process is started.

Finally, to pinpoint the entities to use in the decoder, the network utilizes a memory pointer $G = g_1, g_2, \ldots, g_m$ over the KB:

$$g_i^k = \text{sigmoid}(q^k m_i^k) \quad (9)$$

The pointer label is denoted as $G_{label} = g_1^{label}, g_1^{label}, \ldots, g_1^{label})$ and defined by:

$$g_i^{label} = \begin{cases} 1, & \text{if entity } (m_i) \in Y \\ 0, & \text{otherwise} \end{cases} \quad (10)$$

The memory pointer loss is defined as:

$$\mathcal{L}_{mem} = \log(g_i^k) \times g_i^{label} + \log(1 - g_i^k) \times (1 - g_i^{label}) \quad (11)$$

The decoder 810 utilizes a two-step generation with a copying mechanism as used in sequence-to-sequence Memory Network methods. An RNN is used with the GRU cell as the decoder 810 for the model of the present disclosure. Instead of generating a response with entities, the decoder 810 outputs a canonical response frame with entity types. Equation 12 shows the decoding phase at time step t:

$$h_t^{decode} = \text{GRU}(y_{t-1}^{decode}, h_t^{decode}) \quad (12)$$

The distribution over vocabulary at t is calculated by:

$$P_{vocab}^t = \text{Decode}(h_t^{decode}) \quad (11)$$

In Equation 10, the decoder 810 is a fully-connected layer with softmax activation at the output. The loss function for training is the negative log-likelihood of the gold canonical response:

$$\mathcal{L}_{vocab} = -\Sigma_{t=1}^L \log(P_{vocab}^t(y_t^{canonic})) \quad (14)$$

The gold canonical response is used for training using the same conversion strategy as described in Section Dual context encoder. After generating the canonical response, the entity types are replaced by copying entities from the Knowledge base and dialog context as follows. At each time step t, if an entity type is generated, the KB is queried using $h_t^{decode}$ using the same number of hops as the KB is queried with the hidden dialog context. The entity from memory entry $m_i$ with the highest probability $p_i$ at the last hop (Equation (2)) is used for copying.

To strengthen the copy function, a copy pointer label is defined at one or more decoding time step t as:

$$L_t^{copy} = \begin{cases} \max(i), & \text{if } \exists \text{ entity } (m_i) = y_t \\ M+N+1, & \text{otherwise} \end{cases} \quad (15)$$

An auxiliary loss is used to train the pointer:

$$\mathcal{L}_{ptr} = -\Sigma_{t=1}^{L} \log(p_{L_t^{copy}}) \quad (16)$$

During training, the parameters of the Memory Network are updated using gradients calculated from the sum loss $\mathcal{L}_{vocab} + \mathcal{L}_{ptr} + \mathcal{L}_{mem}$.

Training and Evaluation

Figure 9:
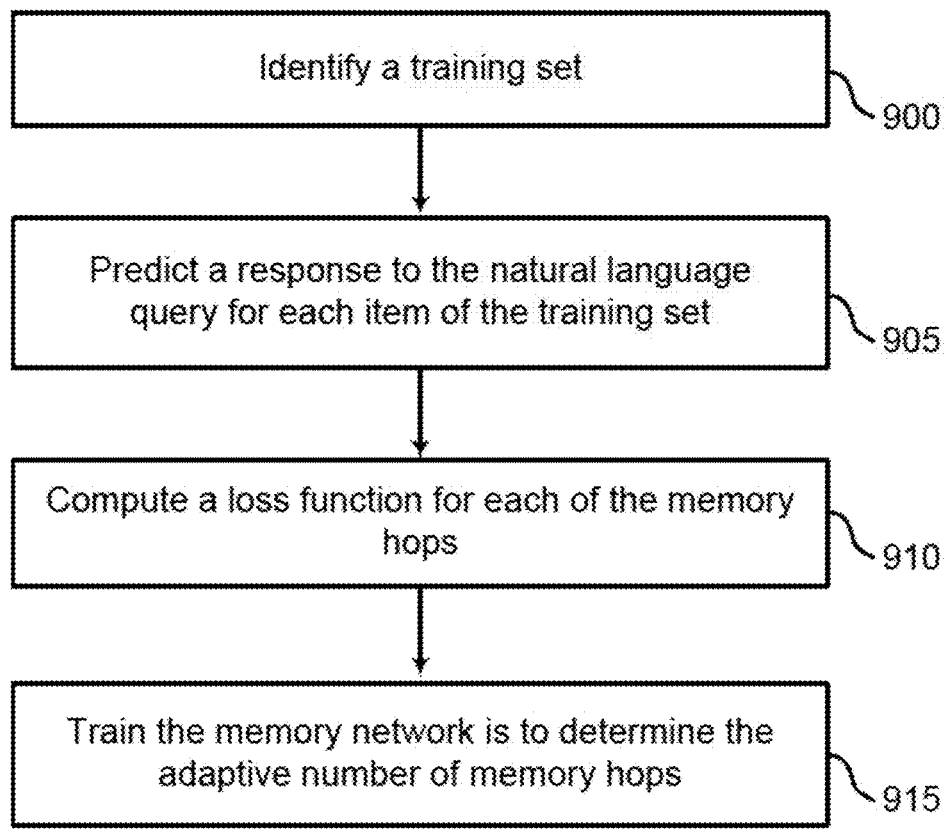
FIG. 9 shows an example of a process for training a dialog system according to aspects of the present disclosure.

FIG. 9 shows an example of a process for training a dialog system according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a dialog system with adaptive recurrent hopping and dual context encoding is described. Embodiments of the method are configured to identify a training set, where each item in the training set comprises a natural language query and a ground truth response. Embodiments of the method are further configured to predict a response to the natural language query for each item of the training set using a memory network, where the memory network performs an adaptive number of memory hops. Embodiments of the method are further configured to compute a loss function for each of the memory hops and train the memory network is to determine the adaptive number of memory hops based on the computed loss functions for each of the memory hops.

The memory controller of the present disclosure may include one single hidden layer and the output layer has two units. Adam optimizers are used to train the parameters of the encoder, the memory module, and the decoder. The learning rate for the optimizers are set to 1e$^{-3}$ at the beginning. With the optimizers of the encoder and the memory module, the learning rate slowly anneals toward 1e$^{-4}$; while the decoder's learning rate stops decreasing at 1e–5.

The number of units in the hidden layers and size of embedding vectors are set to 128. Additionally or alternatively, the dropout rate is set to 0.2 and a teacher forcing ratio is set to 0.5.

At operation 900, the system identifies a training set, where each item in the training set includes a natural language query and a ground truth response. In some cases, the operations of this step refer to, or may be performed by, a training component as described with reference to FIG. 3.

At operation 905, the system predicts a response to the natural language query for each item of the training set using a memory network, where the memory network performs an adaptive number of memory hops. In some cases, the operations of this step refer to, or may be performed by, a training component as described with reference to FIG. 3.

At operation 910, the system computes a loss function for each of the memory hops. In some cases, the operations of this step refer to, or may be performed by, a training component as described with reference to FIG. 3.

At operation 915, the system trains the memory network is to determine the adaptive number of memory hops based on the computed loss functions for each of the memory hops. In some cases, the operations of this step refer to, or may be performed by, a training component as described with reference to FIG. 3.

An apparatus for memory network with adaptive recurrent hopping and dual context encoding is described. The apparatus includes a processor, memory in electronic communication with the processor, and instructions stored in the memory. The instructions are operable to cause the processor to identify a training set, wherein each item in the training set comprises a natural language query and a ground truth response, predict a response to the natural language query for each item of the training set using a memory network, wherein the memory network performs an adaptive number of memory hops, compute a loss function for each of the memory hops, and train the memory network is to determine the adaptive number of memory hops based on the computed loss functions for each of the memory hops.

A non-transitory computer readable medium storing code for memory network with adaptive recurrent hopping and dual context encoding is described. In some examples, the code comprises instructions executable by a processor to: identify a training set, wherein each item in the training set comprises a natural language query and a ground truth response, predict a response to the natural language query for each item of the training set using a memory network, wherein the memory network performs an adaptive number of memory hops, compute a loss function for each of the memory hops, and train the memory network is to determine the adaptive number of memory hops based on the computed loss functions for each of the memory hops.

A system for dialog system with adaptive recurrent hopping and dual context encoding is described. Embodiments of the system are configured to identify a training set, where each item in the training set comprises a natural language query and a ground truth response, predict a response to the natural language query for each item of the training set using a memory network, where the memory network performs an adaptive number of memory hops, compute a loss function for each of the memory hops, and train the memory network is to determine the adaptive number of memory hops based on the computed loss functions for each of the memory hops.

Some examples of the method, apparatus, non-transitory computer readable medium, and system described above further include updating parameters of a subnet based on the loss function computed for each of the memory hops, wherein the subnet is configured to determine the adaptive number of memory hops. Some examples of the method, apparatus, non-transitory computer readable medium, and system described above further include computing a vocabulary loss based on the ground truth response, wherein the loss function is based at least in part on the vocabulary loss.

Some examples of the method, apparatus, non-transitory computer readable medium, and system described above further include computing a memory pointer loss based on an entity used by a decoder of the memory network to replace an entity type in the response, wherein the loss function is based at least in part on the memory pointer loss. Some examples of the method, apparatus, non-transitory computer readable medium, and system described above further include computing a pointer loss based on a pointer label at each of a plurality of steps of a decoder, wherein the loss function is based at least in part on the pointer loss.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a natural language query that relates to information in a knowledge base;
encoding the natural language query to obtain a first query vector;
performing a first memory hop based on the first query vector to obtain a first readout from the knowledge base;
generating a hop label based on the first readout using a meta network of an artificial neural network (ANN);
obtaining a second query vector from a hidden state of the artificial neural network (ANN), wherein the hidden state of the artificial neural network (ANN) is based on the first query vector and the first readout;
performing a second memory hop to obtain a second readout based on the hop label and the second query vector; and
generating a response to the natural language query based on the second readout.

2. The method of claim 1, further comprising:
generating an original context representation based on the natural language query, wherein the first readout is obtained using the original context representation;
replacing an entity in the natural language query with an entity type to generate a canonical query; and
generating a canonical context representation based on the canonical query, wherein the response is generated based on the original context representation and the canonical context representation.

3. The method of claim 2, further comprising:
identifying the entity type based on the entity.

4. The method of claim 1, further comprising:
identifying a first vector for performing the first memory hop based on the natural language query;
generating a second vector based on the first readout using an encoder of a memory network, wherein the second memory hop is performed based on the second vector.

5. The method of claim 1, further comprising:
determining not to perform a third memory hop based on the second readout; and
generating an output vector based on the second readout, wherein the response is generated based on the output vector.

6. The method of claim 1, further comprising:
iteratively performing memory hops when a subnet outputs an indication to continue; and
terminating the memory hops when the subnet outputs an indication to terminate.

7. The method of claim 1, further comprising:
generating a canonical response frame that includes an entity type;
querying the knowledge base based on the entity type to obtain a replacement entity; and
replacing the entity type with the replacement entity to obtain the response.

8. The method of claim 1, wherein:
the knowledge base is queried based on an adaptive number of memory hops.

9. The method of claim 1, further comprising:
receiving a dialog history comprising a plurality of entries including the natural language query.

10. An apparatus comprising:
an encoder configured to generate an original context representation and a canonical context representation for a natural language query, wherein the original context representation comprises an entity and the canonical context representation comprises an entity type in place of the entity;
a memory controller configured to obtain readouts from a knowledge base by performing an adaptive number of memory hops based on the natural language query, wherein the memory controller comprises a subnet configured to generate an indication of whether to perform an additional memory hop based on one or more of the readouts, wherein the adaptive number of memory hops is based on the indication; and
a decoder configured to generate a response based on the canonical context representation and the response.

11. The apparatus of claim 10, wherein:
the memory controller comprises a subnet configured to provide an indication of whether to perform an additional memory hop, wherein the adaptive number of memory hops is based on the indication.

12. The apparatus of claim 10, wherein:
the encoder is further configured to provide an iterative output for performing the adaptive number of memory hops.

13. The apparatus of claim 10, wherein:
the encoder comprises a recurrent neural network (RNN) with a gated recurrent unit (GRU) cell.

14. The apparatus of claim 10, wherein:
the decoder comprises a recurrent neural network (RNN) with a gated recurrent unit (GRU) cell.

15. The apparatus of claim 10, further comprising:
a user interface configured to receive the natural language query and display the response.

16. A method of training a memory network, comprising:
identifying a training set, wherein each item in the training set comprises a natural language query and a ground truth response;
predicting a response to the natural language query for each item of the training set using the memory network, wherein the memory network generates an indication of whether to perform an additional memory hop based on one or more of the readouts and performs an adaptive number of memory hops based on the indication;

computing a loss function for each of the adaptive number of memory hops; and training the memory network to determine the adaptive number of memory hops based on the computed loss functions for each of the adaptive number of memory hops.

17. The method of claim 16, further comprising:

updating parameters of a subnet based on the loss function computed for each of the adaptive number of memory hops, wherein the subnet is configured to determine the adaptive number of memory hops.

18. The method of claim 16, further comprising:

computing a vocabulary loss based on the ground truth response, wherein the loss function is based at least in part on the vocabulary loss.

19. The method of claim 16, further comprising:

computing a memory pointer loss based on an entity used by a decoder of the memory network to replace an entity type in the response, wherein the loss function is based at least in part on the memory pointer loss.

20. The method of claim 16, further comprising:

computing a pointer loss based on a pointer label at each of a plurality of steps of a decoder, wherein the loss function is based at least in part on the pointer loss.

* * * * *